(12) United States Patent
Huber et al.

(10) Patent No.: US 10,938,445 B2
(45) Date of Patent: Mar. 2, 2021

(54) CHECKING A PRESENCE OF AN ELECTRICALLY CONDUCTIVE BODY

(71) Applicants: Klaus Huber, Effeltrich (DE); Claus Seisenberger, Neufrannhofen (DE)

(72) Inventors: Klaus Huber, Effeltrich (DE); Claus Seisenberger, Neufrannhofen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 45 days.

(21) Appl. No.: 15/201,884

(22) Filed: Jul. 5, 2016

(65) Prior Publication Data

US 2017/0012674 A1 Jan. 12, 2017

(30) Foreign Application Priority Data

Jul. 10, 2015 (DE) ........................ 10 2015 212 947

(51) Int. Cl.
*H04B 5/00* (2006.01)
*H02J 7/02* (2016.01)
(Continued)

(52) U.S. Cl.
CPC .......... *H04B 5/0037* (2013.01); *B60L 53/124* (2019.02); *B60L 53/38* (2019.02);
(Continued)

(58) Field of Classification Search
CPC ...... H04B 5/0037; H04B 5/0081; H04B 5/00; G01V 3/10; G01V 3/104; H02J 7/025; H02J 7/02; H02J 50/10; H02J 50/40
(Continued)

(56) References Cited

U.S. PATENT DOCUMENTS 3,758,849 A 9/1973 Susman et al.
5,564,696 A 10/1996 Takemoto et al.
(Continued)

FOREIGN PATENT DOCUMENTS

CN 1088467 A 6/1994
CN 1317698 A 10/2001
(Continued)

OTHER PUBLICATIONS

German Search Report for German Application No. 10 2015 212 947.0, dated Feb. 18, 2016, with English Translation.
(Continued)

*Primary Examiner* — Richard Isla
*Assistant Examiner* — Dung V Bui
(74) *Attorney, Agent, or Firm* — Lempia Summerfield Katz LLC

(57) ABSTRACT

An apparatus checks for a presence of an electrically conductive body in the near field of charging coils of an arrangement for induced charging. At least one transmitting device provides a transmission signal in the form of a magnetic field. At least one receiving device generates a reception signal from the transmission signal and induced into the receiving device. The transmitting device and the receiving device are formed in such a way that, when the electrically conductive body is present, a first reception signal forms and, when the electrically conductive body is absent, a second reception signal, different than the first, forms in the receiving device on account of the induced transmission signal. The transmitting device and the receiving device are formed in a manner dependent on the magnetic field of the charging coils in such a way that, when the electrically conductive body is absent, partial reception signals form in the receiving device on account of the
(Continued)

induced transmission signal, where partial reception signals substantially cancel one another out in the reception signal.

19 Claims, 2 Drawing Sheets

(51) Int. Cl.
```
G01V 3/10      (2006.01)
H02J 50/10     (2016.01)
H02J 50/40     (2016.01)
B60L 53/60     (2019.01)
B60L 53/38     (2019.01)
B60L 53/124    (2019.01)
```

(52) U.S. Cl.
CPC ............... *B60L 53/60* (2019.02); *G01V 3/10* (2013.01); *G01V 3/104* (2013.01); *H02J 7/025* (2013.01); *H02J 50/10* (2016.02); *H02J 50/40* (2016.02); *H04B 5/0081* (2013.01); *B60L 2270/147* (2013.01); *Y02T 10/70* (2013.01); *Y02T 10/7072* (2013.01); *Y02T 90/12* (2013.01); *Y02T 90/14* (2013.01); *Y02T 90/16* (2013.01)

(58) Field of Classification Search
USPC .......................................................... 320/108
See application file for complete search history.

(56) References Cited

U.S. PATENT DOCUMENTS

| | | | |
|---|---|---|---|
| 8,946,938 B2* | 2/2015 | Kesler | H02J 50/12 307/104 |
| 8,994,375 B2 | 3/2015 | Albsmeier et al. | |
| 2001/0030537 A1 | 10/2001 | Honkura et al. | |
| 2004/0260174 A1 | 12/2004 | Keene | |
| 2007/0216392 A1 | 9/2007 | Stevens et al. | |
| 2007/0263747 A1 | 11/2007 | Matsumoto et al. | |
| 2009/0001932 A1 | 1/2009 | Kamijo et al. | |
| 2009/0116571 A1 | 5/2009 | Imai et al. | |
| 2010/0264747 A1* | 10/2010 | Hall | B60L 53/126 307/104 |
| 2011/0199046 A1* | 8/2011 | Tsai | H02J 50/80 320/108 |
| 2012/0049850 A1 | 3/2012 | Reime | |
| 2012/0146580 A1 | 6/2012 | Kitamura | |
| 2012/0181875 A1 | 7/2012 | Wechlin et al. | |
| 2013/0119773 A1* | 5/2013 | Davis | H01F 38/14 307/104 |
| 2013/0169062 A1 | 7/2013 | Maikawa et al. | |
| 2014/0015522 A1* | 1/2014 | Widmer | B60L 53/65 324/239 |
| 2014/0070622 A1 | 3/2014 | Keeling et al. | |
| 2014/0111154 A1* | 4/2014 | Roy | B60L 53/124 320/108 |
| 2015/0015086 A1 | 1/2015 | Krammer et al. | |
| 2015/0015199 A1 | 1/2015 | Krammer et al. | |
| 2015/0293253 A1 | 10/2015 | Eiermann et al. | |
| 2016/0277124 A1* | 9/2016 | Li | H02J 50/10 |
| 2016/0380469 A1* | 12/2016 | Lethellier | H01F 38/14 320/108 |

FOREIGN PATENT DOCUMENTS

| | | |
|---|---|---|
| CN | 1954472 A | 4/2007 |
| CN | 101010897 A | 8/2007 |
| CN | 101213778 A | 7/2008 |
| CN | 101335470 A | 12/2008 |
| CN | 102428390 A | 4/2012 |
| CN | 102474119 A | 5/2012 |
| CN | 102598167 A | 7/2012 |
| CN | 102736041 A | 10/2012 |
| CN | 103098344 A | 5/2013 |
| CN | 104334394 A | 2/2015 |
| CN | 104395131 A | 3/2015 |
| CN | 104604074 A | 5/2015 |
| DE | 102012205283 A1 | 10/2013 |
| DE | 102012205285 A1 | 10/2013 |
| DE | 102014205598 A1 | 10/2015 |
| DE | 102014207253 A1 | 10/2015 |
| WO | WO2013189530 A1 | 12/2013 |

OTHER PUBLICATIONS

Chinese Office Action for Chinese Application No. 201610534155. 5, dated Dec. 11, 2017.

Chinese Office Action for Chinese Application No. 201610534155.2 dated Sep. 10, 2018.

* cited by examiner

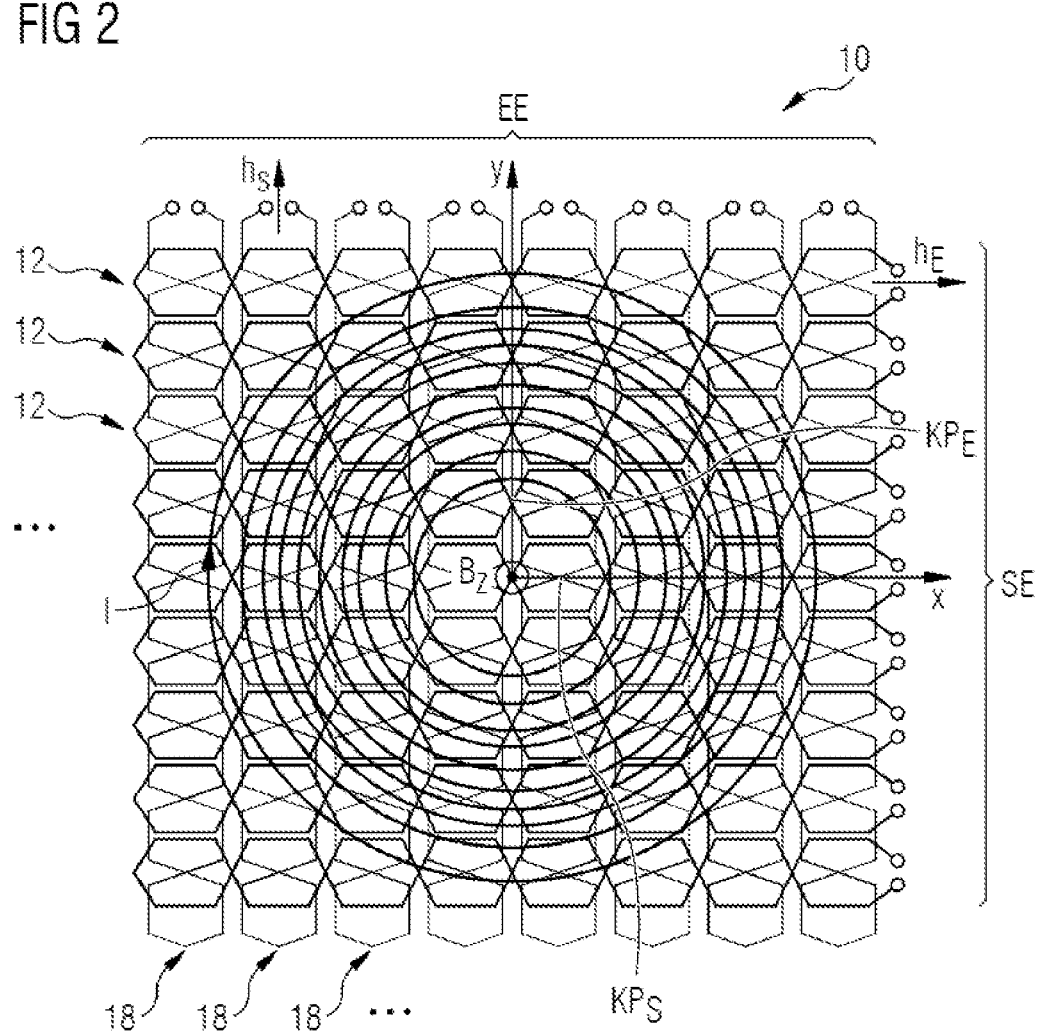

CHECKING A PRESENCE OF AN ELECTRICALLY CONDUCTIVE BODY

RELATED CASE

This application claims the benefit of DE 102015212947.0, filed on Jul. 10, 2015, which is hereby incorporated by reference in its entirety.

FIELD

The present embodiments relate to an apparatus for checking a presence of an electrically conductive body. Furthermore, the present embodiments relate to a charging arrangement for inductively charging an electric vehicle.

BACKGROUND

In the case of inductive charging arrangements for electric vehicles, primary coils and secondary coils are usually used for transferring the electrical energy. When charging the battery of the electric vehicle, electrically conductive bodies are prevented from being able to reach the large air gap between the primary coil and the secondary coil. The electrically conductive body can be heated on account of the action of the charging field in the air gap. In the worst case, for example for metal-coated plastics or for metal-coated papers, a self-ignition of the body could occur.

In order to be able to check a presence of an electrically conductive body in the interspace between the primary coil and the secondary coil, metal detectors are used, for example. Metal detectors are based on various, usually inductive, measurement principles. However, use of said metal detectors specifically for air gap monitoring requires a specifically adapted procedure, since it is necessary to prevent the large metal mass of the vehicle from disturbing the measurement method. Moreover, calibration of the detector before the measurement, as is usual in conventional metal detectors, cannot be implemented straightforwardly.

SUMMARY AND DETAILED DESCRIPTION

It is an object of the present embodiments to demonstrate a solution as to how electrically conductive bodies, particularly in a charging arrangement for electric vehicles, can be identified more simply and more reliably.

This object is achieved by an apparatus or by a charging arrangement. The scope of the present invention is defined solely by the appended claims and is not affected to any degree by the statements within this summary.

The apparatus according to one embodiment for checking a presence of an electrically conductive body in the near field of charging coils of an arrangement for induced charging includes at least one transmitting device (transmit antenna) for providing a transmission signal in the form of a magnetic field. The apparatus includes at least one receiving device (receive antenna) for generating a reception signal from the transmission signal provided by the transmitting device and induced into the receiving device. The transmitting device and the receiving device are formed in such a way that, when the electrically conductive body is present, a first reception signal forms and, when the electrically conductive body is absent, a second reception signal, different than the first, forms in the receiving device on account of the induced transmission signal. The transmitting device and the receiving device are formed in a manner dependent on the magnetic power field of the charging coils in such a way that, when the electrically conductive body is absent, partial reception signals form in the receiving device on account of the induced transmission signal. The partial reception signals substantially cancel one another out in the reception signal.

The apparatus can be used to check the presence of an electrically conductive body in a predetermined ambient region of the apparatus. The apparatus can also be designed to detect a body that is formed at least partly from an electrically conductive material. In particular, the apparatus can be used to check whether an electrically conductive body is situated in an interspace between a primary coil and a secondary coil of a charging arrangement for electric vehicles. The apparatus includes a transmitting device, which can emit a transmission signal in the form of a magnetic field.

Furthermore, the apparatus includes a receiving device, which can receive the transmission signal or parts thereof. In particular, the reception signal can be influenced by the electrically conductive body. This influencing or alteration of the magnetic field can be detected by the receiving device. Consequently, the presence of an electrically conductive body in the ambient region of the receiving device can be deduced on the basis of the first signal and/or the second signal.

In one example, the transmitting device and the receiving device are formed in a manner dependent on the magnetic power field of the charging coils in such a way that no reception signal is detected by the receiving device if the electrically conductive body is not situated in an ambient region of the apparatus.

A significant advantage of this solution is the provision of detection of foreign bodies during inductive charging whilst avoiding inductive couplings between charging coils and the devices for detection (transmitting/receiving device).

The transmitting device and the receiving device can be formed in each case as coils. In this regard, it is possible to provide an apparatus that uses two or more magnetically decoupled coils. In the case free of disturbance bodies, the coils are arranged with respect to one another in such a way that precisely no reception signal can be measured. If the electrically conductive body or the metallic disturbance body is introduced in the reception region of the receiving device, the partial reception signals can be formed in such a way that the partial reception signals do not cancel one another out in the reception signal or the reception signal exceeds the threshold value. In this way, an electrically conductive disturbance body can be detected simply and reliably.

In one configuration, the transmitting device and the receiving device in each case have a form of a conductor loop twisted at least once. A transmitting device and respectively a receiving device including two transmitting coils and including two receiving coils, respectively, can be provided by a conductor loop being twisted once. A transmitting device and respectively a receiving device including a plurality of transmitting coils and receiving coils, respectively, can be provided by a conductor loop being twisted a number of times, that is to say at different positions. A transmitting device and respectively a receiving device can thus be provided simply and cost-effectively.

In a further preferred configuration, the signals are canceled out in the reception signal in such a way that a geometrical embodiment of the transmitting device and/or the geometrical embodiment of the receiving device are/is determined in a manner dependent on a symmetry property of the magnetic power field of the charging coils.

Both a mutual decoupling between transmitting and receiving coils of the apparatus and the decoupling between the apparatus and the primary coil of a charging arrangement can be ensured by a geometrical adaptation to symmetry properties of the magnetic power field.

This advantage is manifested especially if the apparatus according to an embodiment is developed in such a way that given the presence of a point symmetry of the z-component of the magnetic power field in relation to the point of intersection of the y-axis and the x-axis of charging coils mounted in the x-y plane of the transmitting device and receiving device, a) the conductor loops of the transmitting device are arranged geometrically in such a way that the loops become located on the y-axis of the magnetic power field in such a way that an, in particular shaped as an "eye", opening, enclosed by the twisted conductors is incident on the y-axis, b) the conductor loops of the receiving device are arranged geometrically in such a way that the loops become located on the x-axis of the magnetic power field in such a way that a crossover point formed by the twisted conductors is incident on the x-axis.

Preferably, this can advantageously be used in such a way that, or be developed by virtue of the fact that, the charging coils are formed in accordance with a so-called double-D coil system, wherein coil pairs, in particular the primary coils of the double-D coil system, are arranged in the x-y plane axially symmetrically with respect to the y-axis.

In this case, the advantage of the geometrical adaptation on the basis of symmetry is also manifested if the apparatus is alternatively configured in such a way that given the presence of an axial symmetry of the z-component of the magnetic power field in relation to the x-axis and/or y-axis of charging coils mounted in the x-y plane of the transmitting device and receiving device, c) the conductor loops of the transmitting device are arranged geometrically in such a way that the loops become located on the y-axis of the magnetic power field in such a way that a crossover point formed by the twisted conductors is incident on the y-axis, d) the conductor loops of the receiving device are arranged geometrically in such a way that the loops become located on the x-axis of the magnetic power field in such a way that a crossover point formed by the twisted conductors is incident on the x-axis.

Preferably, this alternative can advantageously be used in such a way that, or be developed by virtue of the fact that, the charging coils are formed in accordance with a so-called circular coil system, wherein the midpoint, in particular the primary coil of the circular coil system, becomes located on the point of intersection of the x-axis and the y-axis of the x-y plane.

The receiving device can be formed in such a way that, on account of the magnetic field generated by the transmitting device, partial reception signals are generated in the receiving device. In this case, the receiving device is preferably formed in such a way that these reception signals mutually cancel one another out.

In a further embodiment, the transmitting device includes a predetermined number of transmitting coils arranged alongside one another in a main extension direction of the transmitting device. The transmitting device, too, can be provided by conductor loops arranged alongside one another.

In this case, it is also conceivable for the receiving coils of the receiving device and the transmitting coils of the transmitting device to be formed structurally identically. The transmitting device can also include an even number of transmitting coils. It is thus possible to provide a cost-effective apparatus for checking a presence of a metallic foreign body.

The receiving device can include a plurality of receiving coils, which are formed by respective conductor loops, for example. Between the respective receiving coils, the electrical conductors can be arranged with respect to one another in such a way that they cross one another. In the present case, the receiving coils can be arranged with respect to the transmitting coils such that the crossover point of the receiving coils is arranged centrally with respect to the transmitting coil. What can thus be achieved is that the electric field of the transmitting device is transferred uniformly to two receiving coils.

Preferably, the receiving coils are arranged alongside one another in a main extension direction of the receiving device. Furthermore, the individual receiving coils can be developed, for example, by respective conductor loops. It is thus possible to provide a receiving device that can be produced simply and cost-effectively.

Preferably, the apparatus includes a plurality of transmitting devices and a plurality of receiving devices arranged with respect to one another such that the main extension directions of the transmitting devices are perpendicular to the main extension directions of the receiving devices. It is thus possible to provide an array of transmitting coils and receiving coils. By correspondingly reading the receiving coils, it is thus possible to approximately detect the position and form of the electrically conductive body relative to the individual receiving coils.

Preferably, the apparatus includes a control device, by which the transmitting devices are drivable sequentially for respectively providing the transmission signal. In this way, the individual transmitting devices can be activated in order. By reading all the receiving devices, it is thus possible to approximately determine the position and form of a metallic disturbance body.

The charging arrangement according to one embodiment for charging an electric vehicle includes the apparatus. The apparatus is arranged in particular in an interspace between a primary coil and a vehicle-side secondary coil. The apparatus can reliably detect whether a metallic foreign body is situated in the air gap between the primary coil and the secondary coil.

BRIEF DESCRIPTION OF THE DRAWINGS

The present invention will now be explained in greater detail on the basis of the exemplary embodiments illustrated in the figures, in which:

FIG. 2 shows a schematic illustration of another embodiment of an apparatus for checking a presence of an electrically conductive body in the form of an array, which includes eight transmitting devices and eight receiving devices and is operated by a charging arrangement formed by a double-D coil arrangement.

DETAILED DESCRIPTION

Figure 1:
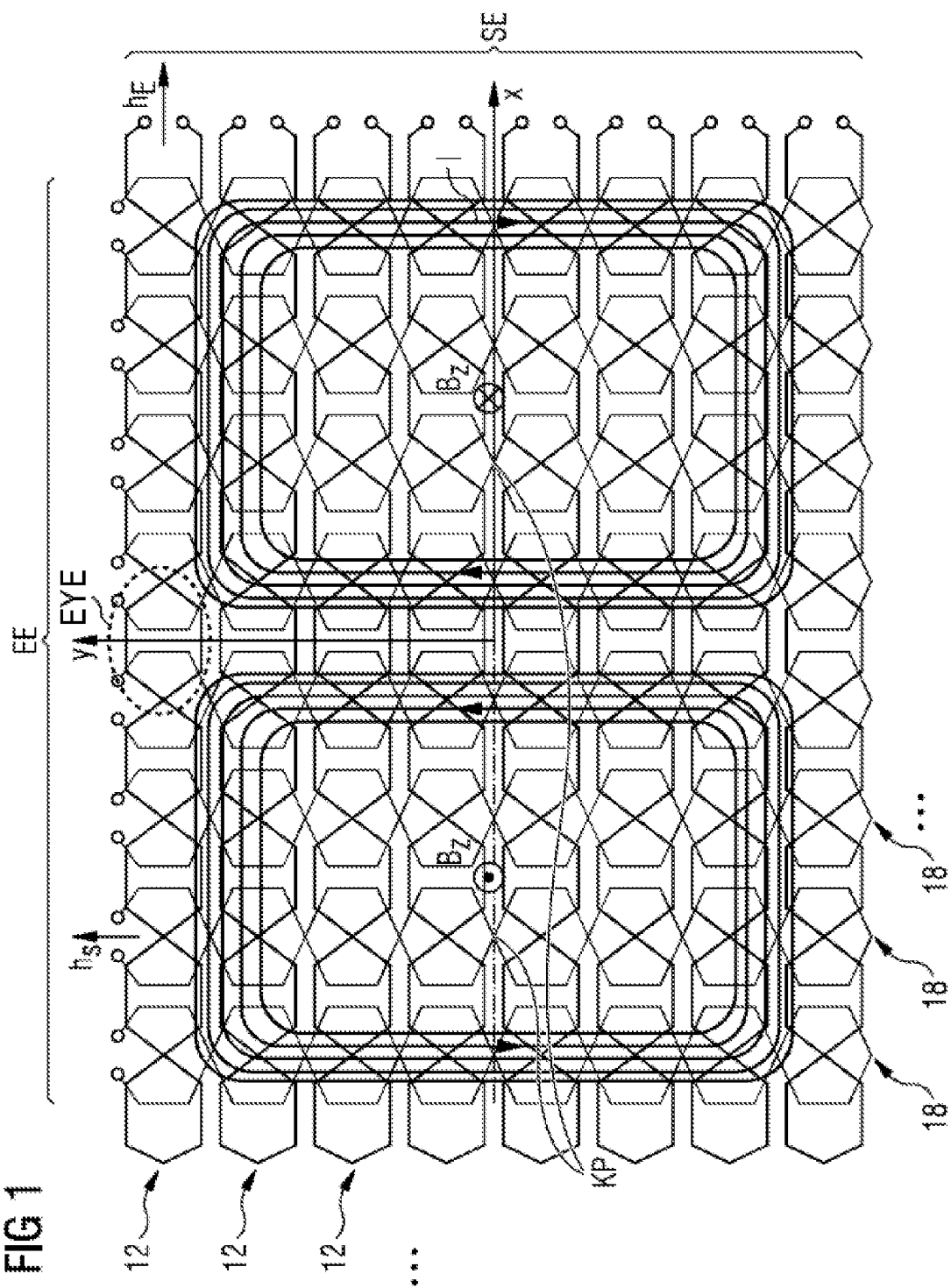
FIG. 1 shows a schematic illustration of one embodiment of an apparatus for checking a presence of an electrically conductive body in the form of an array, which includes eight transmitting devices and eight receiving devices and is operated by a charging arrangement formed by a double-D coil arrangement.

The exemplary embodiments outlined in even greater detail below constitute preferred embodiments.

FIG. 1 shows an apparatus 10 for checking a presence of an electrically conductive body in a schematic illustration of a first array SE of a plurality of transmitting devices 12 and a second array EE of a plurality of receiving devices (receiving strings) 18 including in each case eight transmitting devices 12 and eight receiving devices 18 in the present exemplary embodiment. Such arrays EE, SE afford the further advantage of a significantly larger number of mutually decoupled coils that make it possible additionally to derive size information for a body situated in the induction region or the disturbance object and to carry out controls adapted thereto. In this case, the respective receiving devices 18 and transmitting devices 12 are formed analogously to one another.

In this case, the transmitting devices 12 and the receiving devices 18 are arranged with respect to one another such that a plurality of transmitting-receiving pairs are formed. In this case, each transmitting-receiving pair always consists of a loop antenna and/or a butterfly antenna that lie geometrically one above another such that the pair are magnetically decoupled.

In the present exemplary embodiment, the respective transmitting devices 12 and the receiving devices 18 could be applied to a carrier element (not illustrated) by a corresponding lithography method. In such a configuration, it is possible that conductor tracks can be situated on the top side and on the underside of the carrier element. In this case, the carrier element can be a circuit board, in particular.

The transmitting devices 12 are arranged with respect to the receiving devices 18 such that the respective main extension directions $h_S$ of the transmitting devices 12 are arranged perpendicularly to the respective main extension directions $h_E$ of the receiving devices 18. In other words, vertical and horizontal elongate coils are involved. The vertical and horizontal elongate coils are twisted respectively multiply in the example of the 8×8 arrangement shown here, such that crossover points KP arise.

The present exemplary embodiment shows a double-D coil system as a charging coil arrangement as one possible embodiment of a charging coil arrangement that is point-symmetrical with regard to the z-component $B_z$ of the magnetic power field.

The opposite directions of the z-component can be discerned here. The opposite directions are indicated by the cross and the dot at the center of the primary coils, which are positioned on the left and right of the y-axis y and are illustrated using solid lines.

With this form of symmetry, an embodiment is manifested in which respectively one of the crossover points KP of the receiving strings (devices) 18 produced as a result of the twisting, per receiving string 18, becomes located on the x-axis x, and what is manifested at the same time is that in each case one of the openings EYE bounded by the twisted conductors generally between two crossover points $K_P$, said openings also being referred to as eye, per transmitting string (device) 12, becomes located on the y-axis y (in the drawing, by way of example, only one of the eyes EYE is identified by a dotted circle).

As a result of this superimposition adapted to the symmetry properties according to one embodiment, the geometry alone has the consequence that each horizontal receiving device 18 is decoupled at all eight vertical transmitting devices 12 and also each vertical transmitting coil 12 is decoupled from all eight horizontal receiving devices 18. Primarily, however, an inductive coupling of the arrays EE, SE is prevented, or at least reduced, which arises if this becomes located as intended in the vicinity (in the near region) of the primary coil(s) of the charging coil system of a charging arrangement. A charging arrangement according to an embodiment which uses the apparatuses 10 is accordingly therefore also decoupled from the apparatuses.

In the example illustrated, furthermore, a control device can be provided, by which the individual transmitting devices 12 can be correspondingly driven. In particular, the transmission current I can be applied to the transmitting devices. Moreover, a measuring device can be provided that is designed to receive the reception signals of the individual receiving devices 18 and, if appropriate, to evaluate them accordingly.

If the transmission current $I_S$ is then applied sequentially to each of the transmitting devices 12 and if the eleven induced reception signals $U_E$ of the receiving devices 18 are in each case read out, then 121 different measurement signals are obtained in this example. A further advantage of this arrangement is that drifting of transmitting and receiving electronics can in each case affect entire row and column results and can thus be eliminated in an automatic calibration. At the end regions of the twisted conductor strip structures, which in each case form the transmitting devices 12 and the receiving devices 18, an inhomogeneity necessarily occurs that can result in a reduced decoupling between transmitting device 12 and receiving device 18. This can be avoided by the conductor track routing being changed suitably in this region or by the introduction of discrete components.

The array structure shown in FIG. 1, compared with conventional metal detectors, enables a simple spatial resolution and hence a differentiation, in particular between a vehicle underbody and an actually present electrically conductive body 12 or a disturbance object. As a result of the alternate decoupling of the transmitting device 12 and of the receiving devices 18 and the arrays EE, SE, a sufficient sensitivity and thus utilizable measurement signals can be provided. The arrangement in rows and columns additionally affords the possibility of preventing the drifting of the transmitting and receiving electronics during operation by corresponding calibration.

If a carrier element or the circuit board is used, this affords the advantage that these only have to be contacted at the edges. A possibly disturbing wiring within the circuit board can thus be dispensed with.

FIG. 2 shows the apparatus 10 in accordance with FIG. 1 with the difference that the arrays SE, EE according to another embodiment, depending on the fact that a circular coil system is used as charging coil system, are positioned geometrically differently than in FIG. 1.

In contrast to the double-D system shown in FIG. 1, here the z-component $B_z$ of the charging field is axially symmetrical relative to the other two remaining axes of space (x, y).

In accordance with the development according to this embodiment, therefore, the crossover points $KP_E$ in the center of the receiving strings 12 thus become located on the x-axis x and the crossover points $KP_S$ in the center of the transmitting strings 12 become located on the y-axis y, in order to achieve a comparable decoupling effect between arrays EE, SE and the charging coil of the charging arrangement such as was explained as an advantage in the example illustrated in FIG. 1.

The solutions illustrated in FIG. 1 and FIG. 2 should be regarded only as examples and the invention and the developments thereof are not restricted thereto. Rather, both variants are advantageously developed.

Instead of the arrangement shown in FIG. 2, but also in FIG. 1, for example, any further number and arrangement of transmitting devices 12 and receiving devices 18 is also possible. An odd number of transmitting devices 12 and receiving devices 18 affords the advantage that an arrangement with two-fold axial symmetry arises that can be arranged better in relation to a primary coil and/or a secondary coil of a charging arrangement for an electric vehicle.

Moreover, the number of crossovers provided by the twisting, the number of transmitting and receiving strings 12, 18, the distance between the individual transmitting strings 12 and/or the receiving strings 18 and also the exact geometry can be varied arbitrarily as long as the symmetry conditions according to the invention, i.e. symmetry-dependent positioning of crossover points and/or eyes, remain fulfilled.

Moreover, the outer contour of the sensor area can have arbitrary contours, that is to say can be embodied in a round fashion, for example, as long as the symmetry of the arrays EE, SE relative to the charging field remains provided.

Furthermore, the number of transmitting strings 12 or receiving strings 18 can be even. However, there are also use conditions for which it is advantageous if the apparatus 10 alternatively includes an odd number of transmitting devices 12 and an odd number of receiving devices 18, or combinations of even- and odd-numbered arrangements are used.

If, for example, in each case an odd number of transmitting devices and receiving devices is selected, then a printed circuit board or a circuit board having the arrays EE, SE can be constructed with two-fold axial symmetry. This has an advantageous effect because e.g. the voltage induced by the strong charging field (typically at 85 kHz) in the transmitting and/or receiving coils becomes zero for reasons of symmetry if the axes of symmetry of metal detector circuit board and charging coil system are brought to congruence.

Some embodiments have the advantage that they enable the number of transmitting devices 12 and the number of receiving devices 18 to be chosen freely.

In a further embodiment, the transmitting coils 12 (transmitting strings of the transmitting array SE) and the receiving coils 18 (receiving strings of the receiving array EE) can be applied to the carrier element by a photolithography method. By way of example, the transmitting coils 12 and the receiving coils 18 can be formed from an electrically conductive material, in particular a metal. These can be applied to a circuit board, for example. A corresponding printing method can also be used as an alternative to the photolithography method.

Moreover, one embodiment can then be developed such that the transmitting coils 12 and the receiving coils 18 in each case have partial regions which are arranged on a top side of the carrier element and partial regions which are arranged on an underside of the carrier element. Corresponding plated-through holes can be provided between the partial regions of the transmitting coils and respectively of the receiving coils that are arranged on the top side of the carrier element and those partial regions that are arranged on the underside. It is thus possible to provide a space-saving arrangement of the transmitting coils 12 and receiving coils 18 without short circuits.

The invention is not restricted to the description given above; rather, all configurations and combinations of the claimed developments as encompassed by the claims are encompassed.

These configurations thereby realize advantages, for example:

1. Harmonics caused by the charging system are coupled into the array system EE, SE after having been significantly attenuated, such that detection of foreign bodies (Foreign Object Detection "FOD"), i.e. FOD operation, even with ongoing power transmission, is simplified or actually becomes possible in the first place.
2. The risk of overdriving of the FOD receiver electronics by harmonics decreases overall, such that the electronics of the implementation (for example in the charging arrangement) can be made more sensitive, which in turn makes it possible to detect even relatively small objects at a greater distance from a sensor circuit board, that is to say a circuit board carrying the arrays EE, SE.
3. Undesired couplings between transmitting and receiving coils 12, 18 of the apparatus 10 (the FOD system of, inter alia, the arrays EE, SE) via the charging coil are manifested in a "blurring" of the spatial information, are greatly reduced.
4. A coupling between transmitting and receiving coils 12, 18 of the FOD system 10 is not dependent on the state of the charging system (e.g. changes in the geometry of the charging coil as a result of a temperature increase or aging).
5. The FOD sensor structure (arrays EE, SE) 10 can be mounted at a small distance from the primary coil that in consequence means a smaller structural height. By way of example, the sensor structure can also be integrated directly into the cover of the charging coil, said cover being required anyway.

It is intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

The invention claimed is:

1. An apparatus for checking a presence of an electrically conductive body, the apparatus comprising:
   charging coils of an arrangement for induced charging with a first magnetic field;
   at least one transmitting device separate from the charging coils for providing a transmission signal in the form of a second magnetic field, the at least one transmitting device being decoupled from the first magnetic field of the charging coils; and
   at least one receiving device for generating a first reception signal from the transmission signal provided by the transmitting device with the second magnetic field and induced into the receiving device,
   wherein the transmitting device and the receiving device are formed such that, when the electrically conductive body is present in a near field of the charging coils, the first reception signal forms and, when the electrically conductive body is absent in the near field, a second reception signal, different than the first reception signal, forms in the receiving device on account of the induced transmission signal, wherein the transmitting device and the receiving device are formed in a manner dependent on the magnetic power field of the charging coils in such a way that, when the electrically conductive body is absent in the near field, the second reception signal comprises partial reception signals formed in the receiving device on account of the induced transmission signal, the partial reception signals substantially cancelling one another out in the second reception signal, and wherein, given a point symmetry of a z-component of the magnetic field in relation to a point of intersection of a y-axis (y) and an x-axis (x) of the charging coils mounted in an x-y plane of the transmitting device and the receiving device:
a) first conductor loops of the transmitting device are arranged geometrically such that the first conductor loops are located on a y-axis of the magnetic field such that an opening, enclosed by the first conductor loops, is incident on the y-axis of the magnetic field; and
b) second conductor loops of the receiving device are arranged geometrically such that the second conductor loops are located on an x-axis of the magnetic field such that a crossover point formed by the second conductors is incident on the x-axis of the magnetic field.

2. The apparatus as claimed in claim 1, wherein the transmitting device and the receiving device each have a form of a conductor loop twisted at least once.

3. The apparatus as claimed in claim 1, wherein the partial reception signals are canceled out in the second reception signal in such a way that a geometrical arrangement of the transmitting device, the geometrical arrangement of the receiving device, or the geometrical arrangements of the transmit and receiving devices are determined in a manner dependent on a symmetry property of the magnetic power field of the charging coils.

4. The apparatus as claimed in claim 1, wherein the charging coils are a double-D coil system, wherein primary coils of the double-D coil system are arranged in an x-y plane axially symmetrically with respect to a y-axis.

5. The apparatus as claimed in claim 1, wherein, given an axial symmetry of a z-component of the magnetic field in relation to a x-axis and/or y-axis of the charging coils mounted in the x-y plane of the transmitting device and receiving device,
a) first conductor loops of the transmitting device are arranged geometrically in such a way that the first conductor loops are located on the y-axis of the magnetic field in such a way that a crossover point formed by first twisted conductors is incident on the y-axis,
b) second conductor loops of the receiving device are arranged geometrically in such a way that the second conductor loops are located on the x-axis of the magnetic field in such a way that a crossover point formed by the second twisted conductors is incident on the x-axis.

6. The apparatus as claimed in claim 1, wherein the charging coils are a circular coil system, wherein a primary coil of the circular coil system is located on a point of intersection of an x-axis and a y-axis of an x-y plane.

7. The apparatus as claimed in claim 1, wherein the receiving device comprises a predetermined number of receiving coils arranged with respect to the transmitting device in such a way that the transmission signal is induced into the respective receiving coils substantially in identical portions.

8. The apparatus as claimed in claim 1, wherein receiving coils of the receiving device are arranged alongside one another in a main extension direction of the receiving device.

9. The apparatus as claimed in claim 1, wherein the at least one transmitting device comprises a plurality of transmitting devices and the at least one receiving device comprises a plurality of receiving devices, the pluralities of transmitting and receiving devices arranged with respect to one another such that the main extension directions of the transmitting devices are perpendicular to the main extension directions of the receiving devices.

10. The apparatus as claimed in claim 8, further comprising a control device configured to sequentially drive the transmitting devices for respectively providing the transmission signal.

11. The apparatus as claimed in claim 2, wherein the partial reception signals are canceled out in the second reception signal in such a way that a geometrical arrangement of the transmitting device, the geometrical arrangement of the receiving device, or the geometrical arrangements of the transmit and receiving devices are determined in a manner dependent on a symmetry property of the magnetic power field of the charging coils.

12. The apparatus as claimed in claim 11, wherein the charging coils are a double-D coil system, wherein primary coils of the double-D coil system are arranged in an x-y plane axially symmetrically with respect to a y-axis.

13. The apparatus as claimed in claim 11, wherein the charging coils are a circular coil system, wherein a primary coil of the circular coil system is located on a point of intersection of an x-axis and a y-axis of an x-y plane.

14. The apparatus as claimed in claim 11, wherein the receiving device comprises a predetermined number of receiving coils arranged with respect to the transmitting device in such a way that the transmission signal is induced into the respective receiving coils substantially in identical portions.

15. The apparatus as claimed in claim 14, wherein the receiving coils are arranged alongside one another in a main extension direction of the receiving device.

16. The apparatus as claimed in claim 15, wherein the at least one transmitting device comprises a plurality of transmitting devices and the at least one receiving device comprises a plurality of receiving devices, the pluralities of transmitting and receiving devices arranged with respect to one another such that the main extension directions of the transmitting devices are perpendicular to the main extension directions of the receiving devices.

17. A charging arrangement for inductively charging an electric vehicle, the charging arrangement comprising:
charging coils for induced charging with a first magnetic field;

a conductor presence detector comprising:
- at least one transmitting device separate from the charging coils for providing a transmission signal in the form of a second magnetic field, the at least one transmitting device being decoupled from the first magnetic field of the charging coils; and
- at least one receiving device for generating a first reception signal from the transmission signal provided by the transmitting device with the second magnetic field and induced into the receiving device, wherein the transmitting device and the receiving device are formed such that, when an electrically conductive body is present in a near field of the charging coils, the first reception signal forms and, when the electrically conductive body is absent, a second reception signal, different than the first reception signal, forms in the receiving device on account of the induced transmission signal, wherein the transmitting device and the receiving device are formed in a manner dependent on the magnetic power field of the charging coils in such a way that, when the electrically conductive body is absent in the near field, the second reception signal comprises partial reception signals formed in the receiving device on account of the induced transmission signal, the partial reception signals substantially cancelling one another out in the second reception signal, and wherein, given a point symmetry of a z-component of the magnetic field in relation to a point of intersection of a y-axis (y) and an x-axis (x) of the charging coils mounted in an x-y plane of the transmitting device and the receiving device:

a) first conductor loops of the transmitting device are arranged geometrically such that the first conductor loops are located on a y-axis of the magnetic field such that an opening, enclosed by the first conductor loops, is incident on the y-axis of the magnetic field; and b) second conductor loops of the receiving device are arranged geometrically such that the second conductor loops are located on an x-axis (x) of the magnetic field such that a crossover point formed by the second conductors is incident on the x-axis of the magnetic field.

18. The charging arrangement of claim 17, wherein the at least one transmit device comprises a plurality of transmit devices, further comprising a control device configured to sequentially drive the transmitting devices for respectively providing the transmission signal.

19. The charging arrangement of claim 17, wherein the transmitting device and the receiving device each have a form of a conductor loop twisted at least once.

* * * * *